United States Patent

Seiner

[15] 3,655,129
[45] Apr. 11, 1972

[54] SLOW RELEASE FILMS AND METHODS OF MAKING SAME

[72] Inventor: Jerome A. Seiner, Pittsburgh, Pa.

[73] Assignee: PPG Industries, Inc., Pittsburgh, Pa.

[22] Filed: July 17, 1968

[21] Appl. No.: 745,433

[52] U.S. Cl. ................................................ 239/60, 239/34
[51] Int. Cl. ................................................ A24f 25/00, A61l 9/64
[58] Field of Search ........................... 239/6, 34–60; 8/4; 264/1; 18/58

[56] References Cited

UNITED STATES PATENTS

| | | | |
|---|---|---|---|
| 2,621,163 | 12/1952 | Coash | 424/81 X |
| 3,156,661 | 11/1964 | Feinberg | 424/81 X |
| 3,158,535 | 11/1964 | Beerbower et al. | 424/78 X |
| 3,400,093 | 9/1968 | Feinberg | 424/78 X |
| 3,449,489 | 6/1969 | Gaunt | 424/31 |
| 3,454,510 | 7/1969 | Newland et al. | 424/33 |
| 2,988,284 | 6/1961 | Smith | 239/60 X |
| 1,991,938 | 2/1935 | Houghton | 239/34 X |
| 2,766,066 | 10/1956 | Hopson et al. | 239/34 |
| 2,976,576 | 3/1961 | Wichterle et al. | 18/58 |
| 3,310,235 | 3/1967 | Zbinden | 239/34 |
| 3,361,858 | 1/1968 | Wichterle | 264/1 |
| 3,400,890 | 9/1968 | Gould | 239/36 |
| 3,470,883 | 10/1969 | Shepherd et al. | 131/10 |
| 3,476,499 | 11/1969 | Wichterle | 8/4 |

*Primary Examiner*—Lloyd L. King
*Attorney*—Chisholm and Spencer

[57] ABSTRACT

Disclosed herein are various coatable films which have entrapped within their polymeric matrix minute droplets of a liquid non-solvent. The polymeric matrix and non-solvent are chosen such that there is effected about the film a controlled release of the non-solvent from the film. Utility lies in choosing the non-solvent so that it comprises substances such as perfumes, deodorants, air fresheners, medicines, pesticides, corrosion inhibitors, fungicides, etc. The atmospheres generated are thus used to supply the various substances to a needy environment.

11 Claims, 2 Drawing Figures

Patented April 11, 1972 3,655,129

INVENTOR
JEROME A. SEINER

BY
ATTORNEYS

SLOW RELEASE FILMS AND METHODS OF MAKING SAME

BACKGROUND OF THE INVENTION

This invention relates to polymeric films. More specifically, this invention relates to polymeric films, and methods of making them, which contain various volatilizable liquids that permeate slowly through and out of the films.

Many methods have been devised for forming polymeric films from solutions and quasi-solutions to thereby coat and/or protect a substrate. Generally speaking, most of these methods are primarily concerned with obtaining a film which is opaque.

Opaque films are conventionally prepared by adding a pigment which acts as an opacifying agent to a solution of a film forming material which would otherwise be colorless or transparent when cast in a film. The necessity for adding an opacifying agent obviously increases the cost of the resultant film. Moreover, such films have no more porosity than the non-pigmented film.

Optical opacity, for example hiding in a paint film, is achieved either by absorption of the incident light or by scattering of the incident light, or a combination of these two. Thus, black is opaque because it absorbs the light incident on it and white is opaque because it back scatters the incident light. Light is either absorbed or scattered before it can reach the substrate. The ideal white pigment then is one which has zero absorption and maximum scattering.

Absorption depends primarily on the electronic structure of the molecule, as well as on the pigment particle size relative to the wave length of light. Scattering depends on the relative refractive indices of pigment and vehicle as well as on the particle size of the pigment relative to the wave length of incident light.

One simple description of the relation of the scattering and absorption to the resulting reflectance is that of Kubelka and Munk. At complete hiding, the following equation applies:

$$\frac{(1-R_\infty)^2}{2R_\infty} = \frac{K}{S} \quad (1)$$

where $R$ is reflectance of a film so thick that a further increase in thickness does not change the reflectance, $K$ is the absorption coefficient and $S$ is the Kubelka-Munk scattering coefficient. No account is taken of the surface reflectances, and the equation applies only to internal reflectance.

The fractions contributed by more than one pigment in a system are additive as shown by the following equation:

$$\frac{(1-R_\infty)^2}{2R_\infty} = \frac{C_1 K_1 + C_2 K_2 + C_3 K_3 \ldots}{C_1 S_1 + C_2 S_2 + C_3 S_3 \ldots} \quad (2)$$

where $C_1$, $C_2$ and $C_3$ refer to the concentrations of pigments 1, 2, 3 etc.

When hiding is incomplete, the following equation applies:

$$R = \frac{1 - Rg(a - b \text{ ctgh } bSX)}{a - Rg + b \text{ ctgh } bSX} \quad (3)$$

where $R$ is the resulting internal reflectance, $Rg$ is the reflectance of the substrate, $a$ is equal to $(S+K)/S$, $b = (a^2 - 1)^{1/2}$, $S$ is the scattering coefficient, $X$ is the thickness of the film in mils, and $ctgh$ refers to hyperbolic cotangent.

The Kubelka-Munk scattering coefficient may be computed from the following equation:

$$SX = \frac{1}{b} Ar \text{ ctgh } \frac{1 - aRo}{bRo} \quad (4)$$

where $Ar$ ctgh refers to the inverse hyperbolic cotangent, $Ro$ is the reflectance over a black substrate of 0 percent reflectance, $a$ may be found from the relation, $$a = \frac{1}{2} \left[ \frac{R + Ro + Rg - R}{RoRg} \right]$$

and $b$ is determined as above. In this equation, $R$ equals reflectance over a white substrate and $Rg$ is reflectance of the substrate which is coated; or $a$ may be found from the following equation:

$$a = \frac{1}{2} \left[ \frac{1}{R_\infty} + R_\infty \right]$$

$K$ may be found from the equation $K = S(a-1)$.

The Kubelka-Munk analysis is discussed in further detail by D. B. Judd in "Color in Business, Science and Industry," John Wiley and Sons, New York, 1952 pp. 314–338; and by D. B. Judd and G. Wyszecki in "Color in Business, Science, and Industry," second Edition, John Wiley and Sons, New York, 1963, pp. 387–413, the disclosures of which are incorporated herein by reference.

Various processes have been described in the art for preparing opaque films which rely for opacity upon the presence of a large number of voids in the film. Such films may be prepared by depositing a film from an emulsion, e.g., either an oil-in-water or a water-in-oil emulsion. When a water-in-oil emulsion is used — i.e., one in which minute droplets of water are dispersed in a continuous phase of a film forming material — the emulsion is deposited as a coating and the organic solvent which comprised the continuous phase of the emulsion is evaporated therefrom. This causes gelation of the film forming material and entrapment of the dispersed water droplets. The water is then evaporated leaving microscopic voids throughout the film structure.

When an oil-in-water emulsion is used, the mechanism for forming the film is similar to that described above. A film forming material is dissolved in water. Thereafter, an organic liquid which is a non-solvent for the film former and which is not miscible with water is emulsified in the aqueous phase. The emulsion is cast as a film and the water is evaporated causing the film forming material to gel and entrap minute droplets of the organic liquid. This liquid is then evaporated to cause minute voids in the film structure.

Another technique for obtaining porous, opaque, nonpigmented films is by preparing an aqueous dispersion of a film forming polymer containing a water soluble organic solvent in an amount which is insufficient to dissolve the polymer. This aqueous dispersion is then cast as a film and water is evaporated causing entrapment of minute droplets of the organic solvent in the polymer. The film is then washed to dissolve the entrapped minute droplets of solvent and the film is dried.

Still another technique for obtaining porous, opaque, non-pigmented film is set forth in U.S. Pat. No. 2,961,334. Basically, this process contemplates adding a polymeric material to a liquid solvent to thereby form either a solution or a quasi-solution (i.e., as by peptizing). To this continuous phase is added a liquid which has a higher boiling point than the liquid solvent and which is a non-solvent for the film-forming polymeric materials. The resulting emulsion is then applied to a substrate whereupon an opaque film is formed after first evaporating the water and then the non-solvent.

Although the above techniques have proved useful in producing opaque films, it was not until recently that good, economically feasible, polymeric films having optimum opacity became obtainable. One recently developed technique for obtaining these improved films is disclosed in applicant's co-pending application Ser. No. 524,953 filed Feb. 1, 1966, now abandoned. In this application optimum opacity is achieved by a process which generally comprises: (a) applying to a substrate a composition comprising a film forming gelable polymer, and a solvent mixture for said film forming material comprising at least two miscible liquids, at least one of said liquids being a non-solvent for said polymer and having a lower volatility than that of the other liquids in said mixture, the amount of said lower volatility non-solvent liquid present in said mixture being at least enough to produce, upon the removal of said solvent mixture from said composition, a film having a Kubelka-Munk' scattering coefficient greater than 0.5 reciprocal mils at 4,400 angstroms and greater than 0.1 reciprocal mils at 5,600 angstroms, and (b) removing the solvent mixture from the composition applied to said substrate.

Another technique for obtaining good, economically feasible, polymeric films having optimum opacity is disclosed in co-pending and co-owned application Ser. No. 632,392 filed Apr. 20, 1967, now abandoned. The process disclosed in this application generally contemplates drying a layer of a resinous composition comprising a substantially homogeneous mixture of: (a) a film-forming material containing at least one film-forming polymer; and (b) particulate matter comprising discrete solid particles which contain therein cells of a size between about 0.01 microns and 30 microns, the particle walls being present in amounts such that the cellular volume is from about 30 per cent to about 90 per cent of the total volume of (a) and (b) above. Generally speaking the size and number of cells in the discrete solid particles may be varied within the described ranges to optimize opacity for a particular polymeric system.

Still another technique which has proved extremely useful for obtaining improved films basically includes the steps of applying to a substrate a mixture comprising a latex and a liquid which has a higher boiling point than water and which is a nonsolvent for the polymeric material of the latex, removing the water from the applied mixture while at the same time controlling the flow characteristics of the dispersed polymer substance to an extent sufficient to form a film of the polymeric material having entrapped therein minute droplets of the non-solvent and, removing the nonsolvent, as by evaporation, to leave a film which is white and opaque due to a plurality of minute closed cells.

As disclosed in this copending application polymer flow characteristics may be controlled by four basic procedures depending upon the type polymeric latex system chosen. For example, temperature control may be used to form films of various continuities and opacities regardless of whether the polymeric latex system is a good film former, marginal film former, or nonfilm former. If the polymer of the latex system is a nonfilm former, good film formers, marginal film formers, coalescers, plasticizers, or thickeners may be added in various amounts to control flow. If the latex system, on the other hand, is too good a film former, nonfilm formers, marginal film formers or other flow inhibiting agents may be used to optimize the system. If the system is based upon a marginal film former, good film formers, nonfilm formers, coalescers, plasticizers and/or thickeners may be added to achieve the desired results. By the use of these four basic control techniques or a combination thereof a sufficient number of voids or closed cells may be formed upon removal of the non-solvent therefrom to produce a film having a Kubelka-Munk scattering coefficient greater than 0.5 reciprocal mils at 4,400 angstroms and greater than 0.1 reciprocal mils at 5,600 angstroms.

The terms "good film former," "marginal film former," "nonfilm former", and "latex" are well known in the art and adequately defined in the above cited copending application.

A fourth technique also recently developed, which has proved extremely useful for obtaining improved, economically feasible, white opaque films is disclosed in copending and co-owned application, Ser. No. 557,578 filed June 14, 1966, now U.S. Pat. No. 3,455,489, issued Dec. 1, 1970. This technique basically comprises forming a composition comprising (a) a thermosetting resin and (b) a solvent extractable thermoplastic resin, the resins being at least partially compatible before the thermosetting resin is cured; applying the composition to a substrate as a film; curing the thermosetting resin; and extracting the thermoplastic polymer from the film. The extraction of the thermoplastic polymer from the film results in the formation of a plurality of essentially open cells. In this respect, this fourth technique differs from the other three copending techniques which also form improved films in that these other three techniques can be manipulated to form essentially closed cells while this fourth technique cannot. The entire disclosure of each of these above cited four copending applications is incorporated herein by reference.

Not all methods which have been devised for forming polymeric films from solutions are concerned with opacity. For example, U.S. Pat. No. 3,216,882 discloses a method of making a film which effects a slow release of perfume about it and its substrate. The method basically comprises mixing two miscible solutions, one containing a thermoplastic polymer and the other containing a linear polypolar polymer. The resulting solution is then applied as a film whereinafter the polypolar polymer is extracted therefrom with a solvent to render the film porous, i.e., having pores extending through the film. These open pores then have perfume imbeded within them by chemically or physically bonding the perfume to the walls of the pores. The pores thereafter may be left open or sealed to effect various degrees of release.

SUMMARY OF THE INVENTION

This invention provides various polymeric films, and methods of making them, which contain a plurality of cells having located therein at least one volatilizable liquid which is essentially a non-solvent for the polymer of the polymeric material. Through a selective choice of polymeric material and volatilizable liquid the film which is formed becomes capable of effecting a slow or controlled release of the non-solvent from the films.

The unique films which constitute a part of this invention are films which contain as their volatilizable non-solvent, liquids which include such materials as insecticides, pesticides, and/or fungicides, as well as medicines, insect repellants, deodorants, corrosion-inhibiting agents, and disinfectants. Also provided are films which may contain any of the above non-solvent or perfumes and air fresheners and which exhibit when exhausted of nonsolvent a Kubelka-Munk scattering coefficient greater than 0.5 reciprocal mils at 4,400 angstroms and greater than 0.1 reciprocal mils at 5,600 angstroms. Provided still further are various closed cell films which entrap the above described non-solvent during their formation.

The above films may be made by various unique methods which constitute another part of this invention. Basically these methods contemplate adapting the prior art techniques and the above incorporated copending application techniques, which are concerned primarily with forming opaque films, so as to form films which effect a slow release of the above described non-solvent when incorporated therein.

DETAILED DESCRIPTION OF THE INVENTION

Figure 1:
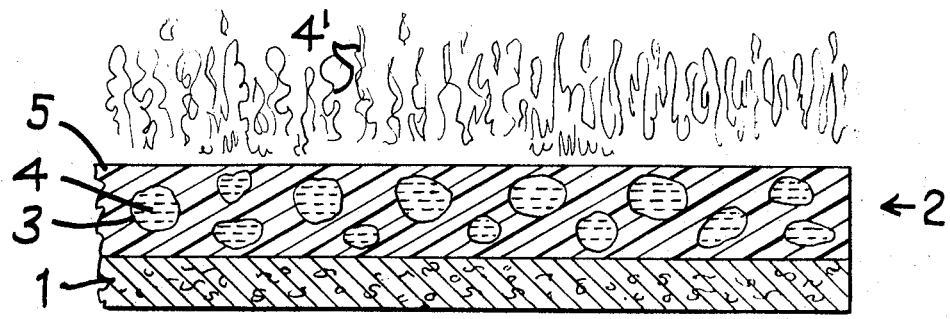
FIG. 1 is a greatly enlarged sectional view of an essentially closed cell film providing a controlled atmosphere about its substrate.

The basic films contemplated by this invention generally comprise a polymeric matrix containing a plurality of cells dispersed throughout the matrix. Within these cells there is located at least one volatilizable liquid which is essentially a non-solvent for the polymers of the polymeric matrix. The polymeric matrix and the liquid non-solvent which comprise the total film will, when taken together, render the film capable of effecting a slow release of the non-solvent from the film.

The above film may have cells which are open and/or closed depending upon the method used to make them. For example, methods for forming films which require a washing or extracting step generally form open cell films while methods which use evaporation or permeation steps to drive-off an entrapped non-solvent generally form closed cell films. Some methods may, because of the type of entrapped liquid used or because they are a combination of two or more of the above techniques, actually form both types of cells in one film.

The size of the cells in the above films is not necessarily critical to the operation of this invention. All that is required of cell size is that the cells not be so large when in open form as to effect a rapid release of a given non-solvent. However, for the purposes of this invention small cells have been found more beneficial than larger ones. That is, cells having diameters less than about 30 microns, preferably less than about 3 – 5 microns, and most preferably less than about 0.5 – 1 microns, depending upon the type process used to form a particular film have been found especially useful since they provide for optimum opacity in the films upon the removal of substantially all of the non-solvent from the cells. Opacity for practical purposes may be defined or described as a film which has a Kubelka-Munk scattering coefficient greater than 0.5 reciprocal mils at 4,400 angstroms and greater than 0.1 reciprocal mils at 5,600 angstroms.

Achievement of opacity is not of primary concern in this invention. However, opacity is useful herein as an aid in determining when a film has become exhausted of non-solvent and is therefore no longer useful for slow release. That is to say, if for a given film system the degree of opacity is predictably reproducible, simply measuring opacity will serve as a very good indication of when a film should be replaced. For example, if a film of this invention includes an air freshener and is used as a paint or coating upon the walls of a clothes closet, high opacity of the film will indicate that the walls need repainting if slow release of an air freshener is still desired.

The various polymers used to form the polymeric matrix of the film of this invention as well as the specific type of non-solvent used will depend primarily upon the technique and materials used to form a particular film. Regardless of the specific film-forming technique used or the type of non-solvent chosen, however, one unique form of slow or controlled release film contemplated by this invention are those films which contain non-solvent that comprise medicines, e.g. decongestants, deodorants, insect repellants, fungicides, pesticides, insecticides, disinfectants and corrosion inhibitors. Another form of film contemplated by this invention includes slow release films which contain any of the above non-solvent or contain perfumes and air fresheners, and exhibit when exhausted of non-solvent, a Kubelka-Munk scattering coefficient greater than 0.5 reciprocal mils at 4,400 angstroms and greater than 0.1 reciprocal mils at 5,600 angstroms. Still another form of film contemplated by this invention contains a plurality of discrete closed cells and is capable of entrapping within these cells during film formation, a non-solvent as described above.

The non-solvent which may be used in any one of the above films may comprise only one, a combination or a mixture of any of the above types of non-solvent or include two or more liquids within one of the above classes of use. The non-solvent, furthermore, may be the medicines etc. themselves, or a liquid which has the medicine etc. dissolved or dispersed therein. Generally speaking the only limitations upon the non-solvent used are (a) that it be volatilizable at some given temperature since this invention primarily contemplates slow release to form a controlled atmosphere of the vapors of the non-solvent about the film and its substrate and (b) in the case of a closed cell film that the non-solvent be capable of entrapment within the film during film formation and capable of permeating through the polymeric matrix which entraps it, at a slow or controlled rate.

The terms "slow release" or "controlled release" are used in this invention to define the ability of a film to provide an atmosphere of an entrapped non-solvent over a finite and useful period of time. This period of time may be only a few minutes to an hour as for example when using decongestants in a film or it may be for periods of weeks, months or years as for example when using air freshener or rust inhibitor paints. In any instance, the term is used to define over and distinguish from the removal of a non-solvent from a film for the sole purpose of rendering the film opaque, which removal is generally achieved as quickly and expeditiously as possible and wherein no actual use is made of the atmosphere formed upon removal of the non-solvent.

The methods contemplated by this invention for forming films containing a plurality of discrete cells capable of entrapping and retaining a volatilizable non-solvent liquid are generally any of the basic prior art techniques which form open and/or closed cells and entrap liquid non-solvent and which in adapted form achieve a film which will effect a slow or controlled release of a selected non-solvent therefrom.

Although all of the above described prior art techniques are generally applicable for forming the unique films of this invention, this invention contemplates within its scope several unique methods for forming slow release films. Basically these unique methods comprise adapting the techniques of the prior art which are primarily concerned with achieving opacity in a film and the incorporated copending application techniques so as to render them capable of effecting a slow or controlled release of a non-solvent retained therein.

One example of an adaptable technique for forming films, which when adapted comprises a method of this invention, may generally be referred to as a solvent precipitation technique and is disclosed in applicant's copending application Ser. No. 524,953, filed Feb. 1, 1966, previously discussed above and incorporated herein by reference. The technique, when adapted for use in this invention, includes first applying to a substrate a composition comprising a film forming gelable polymer, and a solvent mixture for said film forming material comprising at least two miscible liquids, at least one of said liquids being a non-solvent for said polymer and having a lower volatility than that of the other liquids in said mixture. At this point the polymer and solvent mixture form a single phase. Next the liquids of the solvent mixture which have higher volatilities than the non-solvent are removed as by evaporation to thereby form a film containing a plurality of discrete closed cells having entrapped therein minute droplets of the non-solvent. In a preferred form, the nonsolvent is in an amount sufficient such that upon release of the non-solvent droplets from their cells, the film will have a Kubelka-Munk scattering coefficient greater than 0.5 reciprocal mils at 4,400 angstroms and greater than 0.1 reciprocal mils at 4,400 angstroms.

The film forming gelable polymers which may be used in this adapted solvent precipitation technique are well known in the art. They include thermoplastic and thermosetting synthetic as well as natural polymers. The only limitations on the film forming polymers are that: (a) they must be soluble in (i.e. miscible with) the particular solvent mixture used; (b) they must be capable of gelling (i.e. being transformed from the liquid phase to the solid phase) upon evaporation of a portion of the solvent system; and (c) they must be capable of releasing at a slow or controlled rate at least a portion of the entrapped non-solvent. Preferably, the polymers should also be capable of forming upon entrapment and matrix drying (i.e. removing the solvents etc. but not the entrapped non-solvent) a film which is substantially non-opaque. By "non-opaque" is meant a film which is essentially transparent or translucent.

Examples of film forming, gelable polymeric materials, substantially all of which form transparent or translucent films at workable thicknesses (i.e. about 1–5 mils), are abundantly set forth in applicant's copending application Ser. No. 524,953 above discussed and incorporated herein by reference. A preferred group of polymers for use in this technique is a group of polymers which exhibits a low amount of permeability to many useful, non-solvent. such polymers enable an optimum amount of non-solvent to be released over a controllable length of time after the film is formed and thus find especially good utility where perfumes and air fresheners such as cedar oil are incorporated therein. Some examples of these resins are the various vinyl homopolymers and copolymers such as VYHH (a copolymer of 87 parts vinyl chloride per 13 parts vinylacetate), VMCH (a copolymer of 86 parts vinyl chloride and 13 parts vinylacetate per 1 part maleic acid), and mixtures thereof.

As disclosed in Ser. No. 524,953, various solvent mixtures may be used depending upon the polymer system chosen. Classes of liquids which may be employed include ketones, esters, alcohols, aliphatic, aromatic and chlorinated hydrocarbons and the like. Specific examples illustrating some of these liquids will be hereinafter presented.

The actual formation of a film by this solvent precipitation technique is accomplished by first applying the solvent mixture to a substrate. This may be done by any process well known in the art such as brushing, dipping or spraying. After this application of mixture, liquids having higher volatilities than the non-solvent are removed as by evaporation. This removal may be accomplished by any of the well known techniques common to the art. Such techniques include ambient air drying, heated nitrogen gas or air drying, and, in the case of curing during film formation, baking the film. It is understood, of course, that any use of temperatures higher than room temperatures to remove the solvent liquids will not be so high as to cause the non-solvent to evaporate as well.

Another technique for forming films, which when adapted provides another method of this invention, may generally be referred to as a microballon or particulate material technique and is disclosed in copending application Ser. No. 632,392 discussed above and incorporated herein by reference. The technique as adapted for purposes of this invention generally comprises forming a layer of resinous composition comprising a substantially homogeneous mixture of a film forming material containing at least one film-forming polymer and particulate matter comprising discrete solid particles which contain cells of a size between about 0.01 micron and 30 microns having entrapped therein minute droplets of a liquid which is a non-solvent for the discrete solid particles.

The film forming materials which may be used in the practice of this microballon technique include any such material, many of which are well known in the art. These materials, however, must contain at least one film-forming polymer. Examples of suitable polymers include thermoplastic and thermosetting, synthetic and natural polymers. Preferably, the polymers used will form non-opaque films when the non-solvent is present therein.

Examples of suitable film-forming materials for purposes of this technique are abundantly set forth in application Ser. No. 632,392. Generally it may be said that all of the film formers disclosed for use therein are also applicable in this adapted technique, most of which form transparent or translucent films. Some preferred film-forming materials for use therein are carboxylic acid amide interpolymers of the type disclosed in U.S. Pats. Nos. 3,037,963; 3,118,953; 2,870,116; and 2,870,117, the disclosures of which are incorporated herein by reference. Other examples of film formers useful for the purposes of this adapted microballon technique include such naturally occuring materials as casein, shellac, gelatin and the like.

The particles which constitute the microballon or particulate matter employed in this aspect of the invention are discrete, solid entities which contain therein one or more closed cells having entrapped therein minute droplets of a volatilizable liquid which is a non-solvent for the particulate matter. The walls of each particle may be composed of a material which is substantially non-opaque, i.e., the particle walls may be transparent or translucent to incident light rays in order to enable the particle to act as a light scattering agent upon full release of the non-solvent.

Substantially all of the cells have diameters ranging from as low as about 0.01 micron up to about 30 microns. Preferably, the cells are less than about 3 microns, and an especially preferred diameter range is from about 0.01 micron to about 0.8 micron. Films prepared according to the process of this invention but having cell sizes outside of the above disclosed diameter range, although they render the films slightly opaque when the non-solvent is released therefrom generally are extremely inefficient light scatterers and opacifiers. Such films, although operative, do not therefore provide as good an indication of when they are exhausted of non-solvent as do the films having the above preferred diameters and thus more optimum opacities.

The above described particulate matter can be prepared from any material which can be formed into cellular particles of the sizes and structure as described above and which retain this form and entrapped non-solvent during the drying of the film-forming material but which are permeable enough to provide a slow release of the non-solvent thereafter. Such particle-forming materials include many natural or synthetic resinous materials, as for example, substantially all of the materials described above with respect to film-forming materials. Examples of these materials are well documented in incorporated application Ser. No. 632,392. These examples include many materials particularly applicable when used in this aspect of the invention, such as various natural materials including soybean protein, zein protein, alganates, and cellulose.

Particulate matter useful in this technique can be prepared by various methods, including microencapsulation methods which are often especially suitable. For example, polymeric microcapsules are produced by first creating a dispersion of a liquid which is a polymer non-solvent and a polar solvent in a solution of a hydrophobic encapsulating polymer in a non-aqueous non-polar solvent.liquid. The polar polymer non-solvent is present in the form of colloidal droplets which constitute the dispersed phase, with the solution of the polymer constituting the continuous phase. Upon adding a second non-aqueous non-polar liquid, miscible with the polymer solution but in which the polymer is itself insoluble, the polymer is caused to precipitate around the droplets of the polar liquid polymer non-solvent to form the polymeric microcapsules. These particles are suspended as tiny polymeric bodies in an equilibrium mixture of the added liquid and the continuous phase liquid.

As is common to most conventional encapsulation methods, such particles are then separated and gradually insolubilized and hardened by washing with successive liquid mixtures, each comprising intermixed solvent and non-solvent for the polymer, to form upon drying, a finished product consisting of liquid polymer non-solvent filled microcapsules.

The liquid polymer non-solvent is usually prevented from being released through the pores of the polymeric wall material of the capsule, according to such prior art methods, by means of various techniques, such as, for example, rapid performing of the gelation step. For purposes of this invention, however, the above techniques will be used to control rather than to completely retard the future release of the entrapped liquid non-solvent through the pores of the polymeric wall material of the capsule. This may be done, for example, by simply varying the length of the time of the gelation step.

Another method for producing the particulate material of this technique is to first form a thin film by the adapted process, and using the ingredients, of application Ser. No. 524,953, to the extent that a non-solvent is chosen which has a low enough volatility so that the non-solvent will be retained in the film when the matrix is dried. This film may then be lightly flaked or ground-down to a desired particle size such as for example 50–60 microns. Each of these particles has entrapped therein minute droplets of non-solvent and thus may be used as the particulate matter in this invention.

Regardless of how the particulate matter is acquired, which at times may actually be from an independent commercial source, it is vigorously mixed with one or more of the above described film forming materials until a substantially homogeneous mixture is formed. This may be achieved, for example, by dispersing the particulate material containing a liquid non-solvent having a lower volatility than water in the form of a water emulsion and adding this emulsion with vigorous mixing to a latex of the film-forming material. The liquid-solid mixture may then be applied as by spraying or brushing, to a substrate to form a layer thereon. Where the water evaporates from the system there will be formed a polymeric film having dispersed throughout, in substantially homogeneous fashion, particulate material, which film will effect a slow release of the liquid polymer non-solvent therefrom.

It is, of course, understood that many other methods may be used to form the homogeneous mixture and apply it to a substrate depending upon the system being used and the substrate chosen. For example, if it is desired to paint closet walls with such a film, the homogeneous mixture may have various viscosities so as to be spreadable by brush or roller. Likewise, it is understood that various degrees of continuity and opacity may be achieved by such variables as the choice of film-forming material, particulate material, liquid solvents and liquid non-solvent, as well as the amounts of the above materials used and cell size achieved. In this respect it has been found that in general if the cell sizes do not exceed about 3 microns and preferably from about 0.01 to about 0.8 micron and the particulate material is present in amounts such that the cellular volume is from about 30 percent to 90 percent and preferably from 40 percent to 70 percent, of the total film volume (i.e. the volume of the film-former plus particulate material), a substantially continuous film is formed and opacity will be optimized in some instances sufficiently to achieve the Kubelka-Munk coefficient range above described after the non-solvent is removed. By "cellular volume" is meant the total volume of the discrete closed cells in the film.

Another technique, which when adapted forms another method of this invention, and one which has proved very useful, may generally be referred to as a marginal film-forming technique. This technique as adapted for purposes of this invention generally includes first applying to a substrate a mixture comprising a latex and a liquid which is less volatile than water and which is a non-solvent for the polymeric material of the latex. Next the water is removed from the applied mixture as by evaporation while at the same time controlling the flow characteristics of the dispersed polymeric substances to an extent sufficient to form a film containing discrete closed cells having entrapped therein minute droplets of the non-solvent.

For purposes of this invention the non-solvent in this technique, as in the other closed cell techniques, is chosen for its ability to permeate through the film after film formation.

The types of control used during water removal as well as examples of the various types of film formers used (i.e. marginal film formers, nonfilm formers and good film formers), are well documented in the above-cited copending application which has been incorporated herein by reference. If a marginal film former is used, one of the control techniques used is the addition of nonfilm formers, good film formers, coalescers, plasticizers, and/or thickeners to the latex system. If nonfilm formers are used, good film formers, marginal film formers, coalescers, plasticizers, and/or thickeners may be added to control the film flow and form various film continuities. If good film formers are used, flow inhibiting agents including nonfilm formers and marginal film formers are used to control flow. Temperature control about the Tg point or "minimum film forming" point of a given latex system is a control technique applicable to all systems. For the purposes of this invention, anyone or a combination of the above control techniques may be used to form a film upon a substrate.

As in the other techniques, the application of the polymeric latex material to a substrate in this technique may be done by any of the conventional methods such as by brushing, dipping, or spraying. Likewise, water removal processes applicable for use in this technique are well known as, for example, ambient air drying, forced hot air drying, or, in the case of curing a thermosetting resin, baking the film. In all instances the temperatures used must not exceed the point at which a substantial portion of the liquid non-solvent will evaporate from or through the film.

As can be seen from an analysis of the above technique many polymers heretofore thought unusable because of their inability to form films or entrap minute droplets of a non-solvent, may be used to produce good commercially acceptable films. Such a degree of freedom is achieved through the ability to control the flow characteristics of a particular film.

For the purposes of this technique some examples of non-film formers capable of being permeated by a liquid non-solvent are Elvacet 84–1100 (a vinyl acetate homopolymer), latex homopolymers of styrene, and latex homopolymers of methyl methacrylate. Examples of marginal film formers are Lytron 5202 (a butadiene-styrene latex) and copolymers of ethylacrylate and methlmethacrylate. Some good film-formers are vinyl acetate copolymer latex of 75 percent vinyl acetate and 25 percent dibutylmaleate, and Rhoplex AC–34 (an acrylic latex).

Still another technique, which when adapted forms another method of this invention, and one which has proved especially useful, may generally be described as a thermoplastic solvent extraction technique. This technique is disclosed in copending application Ser. No. 557,578 which has been previously discussed and incorporated herein by reference. The technique when adapted for purposes of this invention is an essentially open cell technique which comprises first forming a composition comprising (a) a thermosetting resin and (b) a solvent extractable thermoplastic resin, the resins being at least partially compatible before the thermosetting resin is cured. Next, this composition is applied to a substrate as a film and the thermosetting resin is cured as by baking. Thereafter the thermoplastic resin is extracted from the film as by washing the film with a liquid which is a non-solvent for the cured resin but a solvent for the thermoplastic resin.

At this point there is formed a film having therein a plurality of minute essentially open cells. This film is then charged with a volatilizable liquid which is a non-solvent for the cured resin. Such charging may be accomplished for example, by dipping the film in a bath of a liquid non-solvent for a sufficient period of time to allow the non-solvent to fill the open cells. It is also evident that this charging may also be a recharging of a used film from which substantially all the non-solvent has volatilized.

The thermoplastic resins and thermosetting resins which may be used in the practice of this technique are well known in the art and well documented in the above-cited copending application Ser. No. 557,578 incorporated herein by reference.

One preferred group of thermosetting resins which may be used in this technique for this purpose of this invention are admixtures of interpolymers of hydroxyl esters of ethylenically unsaturated acids with at least one other polymerizable ethylenically unsaturated monomer and a cross-linking agent therefore such as an aminoplast resin. Interpolymers of hydroxyl esters of unsaturated acids with at least one other polymerizable ethylenically unsaturated monomer are prepared by interpolymerizing a mixture of monomers comprising at least 2 percent by weight of a hydroxyalkyl ester of an ethylenically unsaturated carboxylic acid and at least one other ethylenically unsaturated monomer copolymerizable therewith. In many cases, more than one hydroxylalkyl ester is included in the interpolymer, and generally several monomers in addition to the hydroxyalkyl ester or esters are employed. These interpolymers are produced in a manner well known in the art, using conventional procedures utilizing catalysts well known in the art. Free radical producing catalysts are commonly used but catalyst systems which function through other mechanisms can also be employed. The conditions of time, temperature and the like at which these interpolymerizations are carried out are also conventional and depend in large part upon the particular catalyst employed.

Preferred monomer systems used to produce these interpolymers are those containing hydroxyalkyl esters in which the alkyl group has up to about 12 carbon atoms. Especially preferred esters are acrylic acid and methacrylic acid esters of glycol and 1,2-propylene glycol, i.e. hydroxyethyl acrylate and methacrylate.

Other thermosetting resin compositions which may be used in conjunction with a solvent extractable thermoplastic resin which is at least partially compatible therewith and which will form minute discrete particles in the thermoset resin matrix when the thermosetting resin composition is cured include ethylenically unsaturated polyester resins obtained by the condensation of a glycol, such as ethylene glycol, propylene glycol, etc., and a polycarboxylic acid, such as maleic acid, fumaric acid, etc., in combination with a vinylidene monomer such as styrene, vinyl toluene, etc.; and epoxy resins such as obtained by the combination of bis-phenol and epichlorohydrin (e.g., Epon resins) in combination with a curing catalyst such as a polyamine (e.g., ethylene diamine).

Mixtures of two or more thermosetting resins may also be employed.

The thermoplastic resins which may be employed in the practice of this technique for the purposes of this invention are well known in the art. The only limitations on the selection of thermoplastic resin to be used in a particular system is that it must be at least partially compatible with the particular thermosetting resin with which it is used before the thermosetting resin is cured; it must form minute, discrete particles in the thermoset resin matrix upon curing of the thermosetting resin composition; and it must be solvent-extractable.

For the purpose of this technique, resins are considered to be at least partially compatible when they are capable of being admixed to form a homogeneous composition which does not readily separate into distinct phases of its component parts.

Examples of thermoplastic resins which may be used include cellulose derivatives (e.g., ethyl cellulose, nitrocellulose, cellulose acetate, cellulose propionate and cellulose acetate butyrate); acrylic resins (e.g., homopolymers and copolymers with each other or with other monomers of methyl acrylate, methyl methacrylate, ethyl acrylate, ethyl methacrylate, butyl acrylate, butyl metharcylate, acrylic acid and methacrylic acid); polyolefins (e.g., polyethylene and polypropylene); nylon; polycarbonates; polystyrene; copolymers of styrene and other vinyl monomers such as acrylonitrile; vinyl polymers such as homopolymers and copolymers of vinyl acetate, vinyl alcohol, vinyl chloride and vinyl butyral; homopolymers and copolymers of dienes such as polybutadiene, butadiene-styrene copolymers and butadiene-acrylonitrile copolymers.

Solvents which may be used for extraction purposes in this technique are well known in the art and their choice becomes routine once given the thermosetting and thermoplastic resin used. Examples include various alcohols, esters, ethers and the like. The actual formation of the films of this technique is similar to the formation processes of the other techniques in that the thermoplastic-thermosetting resin composition is applied either in powder or solution form to a substrate as by spraying, brushing or dipping. From this point on the various steps of drying, curing and extracting are carried forth by any conventional technique such as by air evaporation, baking, and washing, respectively.

A film formed by this technique prior to charging is characterized by the presence therein of a large number of minute, discrete voids and may be of either a low or of a very high reflectivity. The voids or essentially open cells in the film may be substantially globular in shape or they may be threadlike. The average diameter of the voids is usually less than about 1.0 micron, preferably, less than about 0.05 micron. The lengths of the threadlike voids are generally less than about 3 microns and, preferably, are from about 1 to 2 microns.

Although the above described film-forming techniques are generally the preferred ones for the purposes of this invention, many prior art techniques which have heretofore been primarily concerned with opacity may also be adapted to form other methods within the scope of this invention. For example, the various water-in-oil, oil-in-water, techniques or quasi-solution techniques heretofore discussed which form open cells or entrap liquid non-solvent within discrete closed cells may be adapted to this invention. These techniques use substantially those polymers described above including such polymers as casein, cellulose, polyethylene and the like. In the case of the water-in-oil techniques the water will be provided with a water-miscible polymer non-solvent which upon slow release thereof will provide a useful atmosphere. These techniques are usable in this invention by providing the same adapting principles used in the above discussed techniques of the copending applications.

That is to say, the prior art techniques which form open cells or entrap liquid non-solvent within discrete closed cells may be adapted for use in this invention by providing polymers and liquid non-solvent which when formed together into a film will effect a slow or controlled release of the non-solvent from the film. In the case of closed cells, release will be effected by the permeating and permeability characteristics of the non-solvent and polymers respectively. Where the cells are open, the rate of evaporation of a non-solvent will generally govern the rate of release. Such an adaptation also includes providing enough cells (in the instance of closed cells, providing enough non-solvent) in order to optimize opacity and thus optimize a film's ability to be an indication of its own release life.

Although each technique for forming a slow release film provides within its own mechanism the ability to control the amount of non-solvent released, such as by the choice of non-solvent, choice of polymer, control of flow characteristics so as to control continuity, control of gelation of particulate matter, etc., it has been found that the addition of filler material to the films of the closed cell technique may be used to control, or effect various degrees of, non-solvent release. Examples of filler material useful for the purposes of this invention include such materials as silica, clay, alumina, and the like. It is believed that when these materials are included in a film formed by one of the above closed cell techniques, they provide sites about which the non-solvent may more easily permeate, thus increasing the rate of release. It is understood, of course, that the filler material may be added at any time prior to film formation. Usually, however, it is added to the initial mixture before the mixture is applied to a substrate.

Another method for controlling the rate of release of non-solvent from a film is the control of film temperature. This method is applicable to all systems regardless of whether they have open or closed cells. Control of film temperature may be effected in various ways as, for example, by locating heaters within the film or substrate or merely providing a temperature control ambient to the film and its substrate. This technique of controlling release is especially useful when dealing with closed cell systems wherein the polymeric matrix of the film is of relatively high impermeability and/or the non-solvent is relatively nonpermeating or volatilizes at a relatively high temperature. In such instances, heat will be added to the system in an amount sufficient to effect a desired rate of release but ordinarily insufficient to destroy the properties of the film.

Temperature control also serves the unique purpose in instances where such things as deodorants are used, since such control efficiently and accurately regulates release as it is needed. For example, a deodorant's release rate can be made to increase as body temperature increases and vice versa.

As alluded to above, many and varied uses can be made of the films of these inventions depending upon the particular volatilizable, liquid, polymer non-solvent used. For example, the liquid non-solvent may include such materials as perfumes, medicines, e.g. decongestants, deodorants, insect repellants, air fresheners, fungicides, pesticides, insecticides, disinfectants, corrosion-inhibitors, and the like. The nonsolvents may also be mixtures of the above or include two or more similar non-solvent.

An especially preferred embodiment of these films contemplates the entrapment therein of volatilizable antipestilence liquids such as insecticides, fungicides, and pesticides as the non-solvent liquid. These films may then be sprayed on crops to protect them from various vermin, blights, etc. which may attack and destroy them. Of especially good utility in this respect are those films formed by the above described adapted techniques which, because of an excessive use of liquid nonsolvent or through proper control of polymer flow characteristics found essentially semicontinuous in nature. Such films may be sprayed upon a leafy crop without fear of injuring the crop by completely coating its leaves.

Figure 2:
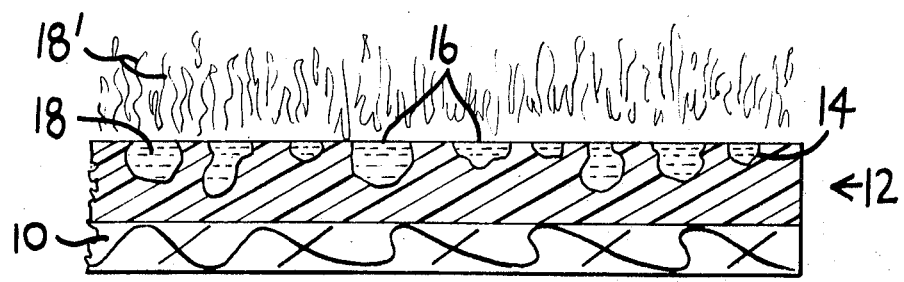
FIG. 2 is a greatly enlarged sectional view similar to FIG. 1 but illustrating a different type of substrate and an essentially open cell film.

FIGS. 1 and 2 illustrate various ways in which the films of this invention may be used. FIG. 1, for example, depicts a greatly enlarged section of a substrate 1 made of fiberboard or other wall board which might be a liquid having a perfume in a clothes closet, pet's dwelling, e.g. dog house, etc. This substrate 1 has coated upon it in film 2. The film 2 includes a plurality of closed cells 3 having entrapped therein a liquid 4 which is a non-solvent for the polymer matrix 5. The film 2 is illustrated as effecting the slow release of the liquid 4 to provide a controlled atmosphere of vapors 4' about the film 2 and the substrate 1. As discussed above, the liquid non-solvent 4 may actually be one or several liquids. It may be a specific perfume etc. alone or it may include a liquid having a perfume etc. dispersed or dissolved therein. For example, the non-solvent may be a volatilizable oil having dissolved therein an air freshener, insecticide, or fungicide for a closet, pet dwelling, or animal bedding.

FIG. 2 illustrates a greatly enlarged section of a substrate 10 which may be of cloth or other woven fabric having coated thereon a film 12. The film 12 includes a plurality of substantially open cells 14 having open ends 16 which contain a liquid non-solvent 18, said liquid non-solvent upon evaporation emitting vapors 18'.

As alluded to hereinabove, the non-solvent may be any of a number of specific liquids such as perfumes, insect repellants, medicine, deodorants, and the like. The substrate may also be of various types such as human apparel, pet's clothing and bedding, etc.

It is evident from an analysis of the above disclosure that many other uses, too numerous to mention, are well within the grasp of the artisan once given the teachings of this invention. Such uses are of necessity and convenience incorporated herein by reference.

PREFERRED EMBODIMENTS

The following examples generally comprise the best modes contemplated for carrying out the above-disclosed invention. However, these examples are for illustrative purposes only and do not limit the disclosure hereinbefore set out.

EXAMPLE 1

A butylated melamine-formaldehyde resin is prepared by admixing 1,000 parts of a butyl alcohol solution of formaldehyde (40 percent formaldehyde) and 705 parts of butanol. The acid number of this charge is adjusted to from about 0.25 to 0.29 and there are then added 340 parts of melamine. The charge is heated at between about 210° and 225° F. for 9 hours and there are then added 8 parts of sodium carbonate and 41 parts of butanol. The mixture is then heated to distill butanol. The reaction mixture is diluted with sufficient xylene and butanol to give a solution comprising 50 percent solids, the solvent comprising a 1:1 mixture of xylene and butanol. The butylated melamine-formaldehyde resin in the solution contains a mole ratio of melamine:formaldehyde:butanol of 1.5:5.5:6.0.

The composition is prepared by mixing 60.0 g. of the above described butylated melamine-formaldehyde resin solution and 70.0 g. of a solution of an acrylic interpolymer obtained by copolymerizing a mixture comprising 30 percent styrene, 30 percent 2-ethylhexyl acrylate, 18 percent methyl methacrylate, 11 percent butyl methacrylate, 4 percent hydroxyethyl methacrylate, 4 percent hydroxypropyl methacrylate and 3 percent methacrylic acid, one-third of the methacrylic acid being previously reacted with ethylenimine. The solution of the interpolymer comprises 60 percent solids and 40 percent of a solvent composed of 15 percent butanol, 62 percent toluene and 23 percent xylene. To the mixture of the two resins there are added 70.0 g. of a solution comprising 50 percent xylene and 50 percent of a thermoplastic acrylate copolymer obtained by copolymerizing 10 percent butyl glycidyl fumarate, 45 percent 2-ethylhexyl acrylate and 45 percent methyl methacrylate. The resulting mixture is sprayed onto an aluminum molding strip for a clothe closet wall, the strip is air dried for one-half hour and then baked at 325° F. for one-half hour to cure the thermosetting resin composition. A translucent film is obtained which is cooled to room temperature and then immersed in xylene for 2 minutes to extract the minute, discrete particles of the thermoplastic resin from the thermoset resin matrix. After evaporation of the xylene from the film an opaque, essentially open celled film is obtained. The molding strip is then dipped for 5 minutes in a bath of cedar oil, removed, wiped of external oil, and placed in a clothes closet. The charging of the film with cedar oil renders the film translucent. The film effectively releases cedar-scented air freshener for approximately 9 ½ weeks as indicated by the increasing opacity of the film. The strip is then removed, redipped in cedar oil and reinserted in the closet for continued air freshener release.

EXAMPLE 2

Twenty gms. of a copolymer (by weight, 91.25 percent methyl methacrylate, 2.00 percent acrylamide, 4.25 percent hydroxyethyl methacrylate and 2.50 percent methacrylic acid reacted with ethylenimine) are admixed with 10 gms. of acetone, 6 gms. of cedar oil and 0.5 gms. Santocel 62 (silica extender). A film of this material is brushed on the inside walls of a closet. The closet retains the scent of cedar for several days whereinafter the film turns white signifying that the cedar oil nonsolvent that is entrapped within the film upon film formation has evaporated.

Similar results are achieved when various other amounts of silica extender are added. For example, when 0.1 gms. of silica are added, release of the cedar oil from the film is extremely slow. When 0.7–0.8 gms. of silica are added they cause a more rapid release, but because of this high amount of film inhibiting agent present, a continuous film is difficult to form. If no silica is added the release is so slow as to be generally unacceptable for closet wall use.

EXAMPLE 3

A base solution is formed of 60 gms. VYHH (a copolymer of 87 percent by weight vinyl chloride and 13 percent by weight vinyl acetate) and 40 gms. VMCH (a copolymer of 86 percent by weight vinyl chloride, 13 percent by weight vinyl acetate, and 1 percent by weight maleic acid), dissolved in 500 gms. of methyl ethyl ketone.

To 60 gms. of this base solution are then added with agitation 70 gms. of xylene and 7.0 gms. of a conventional liquid decongestant containing menthol, eucalyptol, turpentine, camphor, oil of thyme, and nutmeg all formulated into petrolatum and strained to remove the petrolatum. This mixture is then brushed on an aluminum substrate and dried of solvent to a thickness of about 0.3–0.5 mils. The film slowly releases decongestant into the air about it. To speed release the film is bent or lightly abraded to rupture at least some of the cells located in the film which contain the decongestant. Upon total release, the film is a bright white.

EXAMPLE 4

To 60 gms. of the base solution of Example 3 are added 7.0 gms. of a deodorant-disinfectant containing o-phenyl phenol, p-benzyl p-chloro phenol, ethanol, xylenol, isopropanol all formulated in glycerol, propylene glycol and water. A film of this mixture is brushed onto a substrate. The resulting film is 0.5–0.6 mils thick and after light abrasion sufficient to rupture at least some of the disinfectant containing cells releases disinfectant very slowly therefrom. Without abrasion release occurs even more slowly.

EXAMPLE 5

To 60 gms. of the base solution of Example 3 are added 7.0 gms. of an insecticide containing pyrethrins, butyl carbityl-6-propylpiperonyl ether, 2,2 bis(p-methoxyphenyl)-1,1,1-trichloroethane, and petroleum distillates formulated into hydrocarbon solvents. A dried film of 0.5–0.6 mils thickness after light abrasion or bending releases insecticide over a controlled period of time.

The addition of 1.6 gms. of Santocel 62 (silica extender) enables the film to slowly release insecticide into its environment without film abrasion. Rate of release is increased by light abrasion of the film. Such a film may be rendered discontinuous by the addition of more silica and therefore may be sprayed in the area of vegetation so as to release insecticide into this area and thus protect the plants therein.

EXAMPLE 6

To 60 gms. of the base solution of Example 3 are added 7.0 gms. of a conventional phenyl mercine acetate liquid fungicide. A film of this mixture is brushed upon a tiled shower stall floor and wall which during the summer season tends to be constantly damp and thus incubates fungus. The film is lightly abraded and thereinafter slowly releases fungicide. Because water from the shower tends to deplete the film of fungicide rather rapidly when ruptured or open cells are used to effect release, in another embodiment, 1.6 gms. of silica extender are used to aid release rather than abrasion. The film having silica therein slowly releases fungicide for many days, whereinafter it turns a bright white signifying that it is depleted.

EXAMPLE 7

To 60 gms. of the base solution of Example 3 are added 7.0 gms. oil of citronella (insect repellant). The solution is sprayed upon a piece of cloth such as the cuff or collar of a work shirt. The dried film is 0.6–0.7 mils thick and slowly releases the insect repellant. Upon bending, as would occur when one is working in the shirt, the release is much more rapid and the scent of citronella is very strong.

EXAMPLE 8

To 60 gms. of the base solution of Example 3 is added 7.0 gms. of a conventional antiperspirant (personal deodorant) containing aluminum chlorhydroxide complex and benzalkonium chloride. The resulting film is coated upon the inside of a piece of cloth such as a shirt. The film is 0.5–0.6 mils thick and gives off a very slow and only a slight release of antiperspirant due to the low volatility of this material. Upon bending of the film as would occur when working in the shirt or upon increase in temperature above room temperature the release of antiperspirant increases. However, because the antiperspirant has a low volatility, best release is effected by abrading the film to effect removal of contact rather than evaporation.

EXAMPLE 9

To 60 gms. of the base solution of Example 3 are added 7.0 gms. aniline (corrosion inhibitor). A film formed of this mixture when brushed onto a metal substrate releases the aniline over about an 8 day period to thereby effectively prevent corrosion of the metal substrate and metallic material in the vicinity of the controlled atmosphere so formed. Other, less volatile amines may be used to effect slower release and longer protection.

EXAMPLE 10

To 60 gms. of the base solution of Example 3 are added 7.0 gms. cedar oil (perfume, air freshener). This mixture is then sprayed onto the inside walls of a clothes closet. The resulting film without abrasion or bending slowly releases a pleasant scent of cedar over an 8 day period into the closet. Upon depletion of the oil from the film, the film turns a bright white.

Once given the above disclosure many other examples, embodiments, features and modifications will become apparent to one skilled in the art and thus are included within this invention, the scope of which is to be determined by the following claims.

I claim:

1. A film comprising a polymeric matrix containing a plurality of cells, said cells containing at least one volatilizable liquid which is essentially a non-solvent for said polymeric matrix, said film being capable of effecting a slow release of said liquid non-solvent therefrom, said nonsolvent comprising a releasable material selected from the group consisting of medicines, disinfectants, insecticides, pesticides, fungicides, insect repellants, deodorants, and corrosion-inhibitors.

2. A film comprising a polymeric matrix containing therein a plurality of discrete cells, said cells containing at least one liquid which is a non-solvent for said polymeric matrix, which is capable of entrapment within said film during film formation, and which is capable of being released from the film, said polymeric matrix being of a sufficient impermeability with respect to the liquid non-solvent as to effect a slow release of said non-solvent from said film.

3. A film comprising a polymeric matrix containing a plurality of cells, said cells containing at least one volatilizable liquid which is essentially a non-solvent for said polymeric matrix, said film being capable of effecting a slow release of said liquid non-solvent, and said film, upon substantially complete release of said non-solvent being opaque and having a Kubelka-Munk scattering coefficient greater than 0.5 reciprocal mils at 4,400 angstroms and greater than 0.1 reciprocal mils at 5,600 angstroms.

4. A film according to claim 1 wherein said cells are generally open cells.

5. A film according to claim 2 wherein said cells are generally closed cells.

6. A film according to claim 2 wherein said liquid non-solvent comprises a releasable material selected from the group consisting of perfumes and air fresheners.

7. A film according to claim 2 wherein said film also includes a filler material which when included in the film increases the rate of non-solvent release.

8. A film according to claim 2 wherein said liquid non-solvent comprises a releasable material selected from the group consisting of insecticides, fungicides, pesticides, insect repellants, deodorants, and corrosion-inhibitors.

9. A film according to claim 2 wherein said liquid non-solvent comprises a medicine.

10. A film according to claim 9 wherein said medicine comprises a decongestant.

11. A film according to claim 1 wherein said film also includes a filler material which when included in the film increases the rate of non-solvent release.

* * * * *